Dec. 13, 1966  M. A. SARTORE  3,290,841
APPARATUS FOR NETTING MEAT AND MEAT PRODUCTS
Filed Sept. 15, 1965
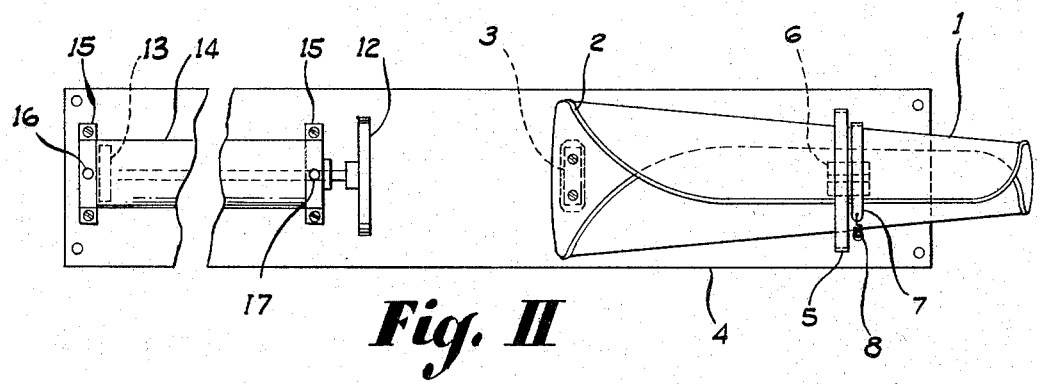
Fig. II
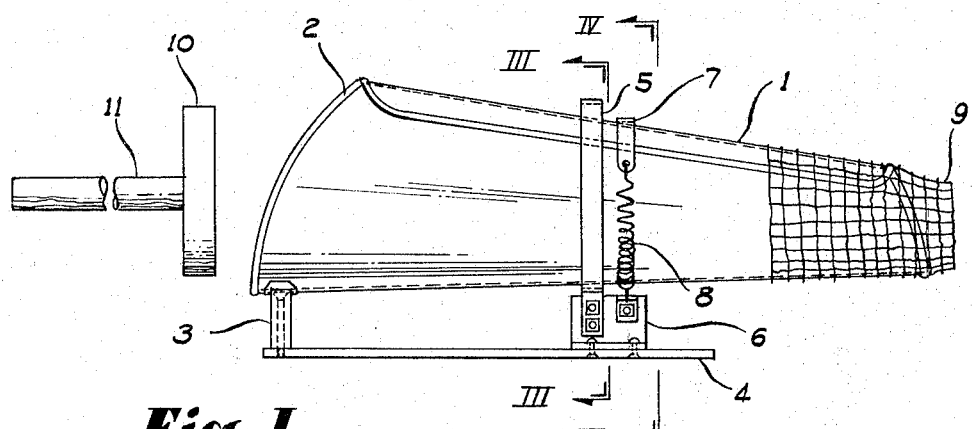
Fig. I
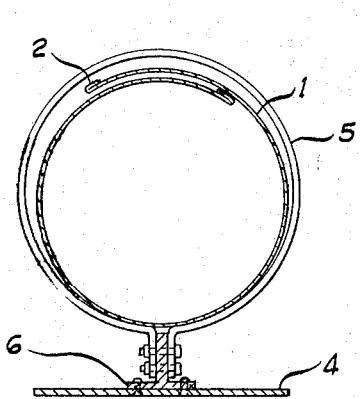
Fig. III
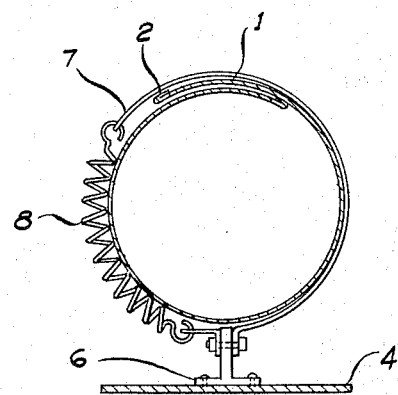
Fig. IV
INVENTOR.
MICHAEL A. SARTORE
BY Lloyd F. Engle, Jr.

United States Patent Office 3,290,841
Patented Dec. 13, 1966

3,290,841
APPARATUS FOR NETTING MEAT AND MEAT PRODUCTS
Michael A. Sartore, 152 Broadway Drive, Pittsburgh, Pa.
Filed Sept. 15, 1965, Ser. No. 487,399
3 Claims. (Cl. 53—258)

This invention relates to a method for netting meat and meat products and the apparatus employed therefor.

It has long been the practice, particularly in the retail trade, to tie certain cuts of meat into a compact form for preparation for human consumption, such as in the case of rolled roasts. In this prior art, the most rudimentary means employed has been hand tying and this procedure was extremely time consuming and it was virtually impossible to effectively tie more than one piece of meat into a singe roast. Further, depending upon the skill of the operator, the final results were often unsatisfactory, either at the time of purchase or cooking as a result of the tying cord being displaced or slipping.

Subsequently, there were improvements made in the art which generally comprised a reticulated net used to surround the meat. In later modifications the reticulated net was used in tubular forms of varying diameters and the meat was forced through cylindrical tubes of correspondingly varying diameters and into the nets. The results achieved through the use of these modifications still depended, to a great extent, upon the skill of the operator, for the choice of the diameter of tubular netting and the cylindrical tube employed was highly critical; that is to say, if the diameter chosen were too large, the meat would not be effectively confined and, if the diameter were too small, the cords of the netting would cut into the meat or break. Further, it was necessary to provide a relatively large number of cylindrical tubes and tubular nets of different diameter, in order to accommodate the many variable sizes of meat to be netted.

Recently, an elastic tubular netting has been developed which is comprised in materials which are not adversely affected by the heat of cooking and do not impart any taste or odor to the meat encased therein. I have discovered that it is possible to accomplish the netting or enclosing of virtually all the different sizes of meat cuts or several pieces of meat by the use of a single tube or stuffing horn embodying the features of my invention in conjunction with the elastic tubular netting.

I provide a tube which is expandable circumferentially and is comprised in a thin sheet of flexible metal or plastic substantially in the shape of a truncated cone. Lateral cross-sections of my horn disclose a circular form which is not closed but, rather, is split along a uniform longitudinal line with the edges overlapping. The extent of the overlap, preferably, varies, being proportionately greater near the smaller end of my horn, since that is where the greatest expansion occurs during the stuffing operation. My horn is rigidly attached to a fixed base proximate its larger end and at a point circumferentially disposed opposite the overlapping split. Proximate the longitudinal mid-point of my horn I provide a guide ring which is in non-engaging contact with the horn at a point circumferentially disposed opposite the overlapping split. The guide ring is rigidly attached to the fixed base and surrounds the horn in non-concentric variable spaced relation. Adjacent the guide ring, I provide a restraining means comprised in a flexible strap of metal or plastic sheet and a helical spring which are in attached engagement with the fixed base and surround the horn in slidable engagement therewith.

In actual operation the horn is usually mounted so that the longitudinal center line is substantially horizontal. The open end of a piece of tubular elastic netting is slipped over the smaller end of the horn and is pulled over that end of the horn until only a small amount of unexpanded loose netting remains beyond the end of the horn to receive the meat. I have also used pieces of tubular elastic netting having one end pre-closed. However, this is not necessary in the use of my invention, since the meat passing from the horn will carry the netting with it through contact with the small amount, in the nature of one (1) to four (4) inches, of unexpanded loose netting. The meat to be netted is placed inside the large end of the horn. The head of the hand plunger, which is preferably comprised in a hard wood shaped in the form of a greatly enlarged nail, is placed against the meat and forced through the horn, pushing the meat out through the small end of the horn and into the netting which slides off of the horn. This plunger is then withdrawn and the entire operation repeated with the next piece or pieces of meat to be netted. The head of the plunger is of slightly less diameter than the inside diameter of the guide ring, in order that it will pass through the portion of the horn surrounded by the guide ring.

I also provide a mechanically operated version or embodiment of my horn. In this embodiment there is no hand plunger used but, rather, the plunger is comprised in a piston slidably engaging a hydraulic or pneumatic cylinder which is mounted in fixed engagement with the base and in spaced relation with the large end of the horn. The center line of the piston and cylinder coincides with center line of the horn extended beyond the large end. In this embodiment, after the netting and meat are in place, the mechanical plunger is activated by fluid or gas pressure and moves through the horn, forcing the meat into the netting.

I have also used both of the aforementioned embodiments of my invention mounted in a vertical position with the small end of the horn disposed downward. In this position, less force is required on the plunger because of the weight of the meat being netted.

For most practical uses, in retail markets where meats of this nature are tied, I prefer that the shell of my horn be formed in stainless steel sheet. The use of stainless steel eliminates corrosion and improves sanitary conditions.

One object of my invention is to provide an apparatus and method for restraining and encasing meats in an expeditious and economical manner. A further object is to effectively, appealingly and safely restrain and encase meats preparatory to cooking. Other, additional objects and advantages of my invention will appear from the specification and claims.

Referring to the drawings:

FIG. I is an elevation view of my expandable horn or tube and the hand plunger used therewith and showing the elastic netting drawn over the small end of the horn in position to receive the meat to be netted.

FIG. II is a plan view of my expandable horn or tube and the mechanical, piston-type plunger used therewith.

FIG. III is a cross-sectional view of my expandable horn or tube taken in the plane of section line III—III of FIG. I.

FIG. IV is a cross-sectional view of my expandable horn or tube taken in the plane of section line IV—IV of FIG. I.

In the construction of my invention, I prefer to use stainless steel or plastic for the shell of the expandable horn or tube, the guide ring and the strap and I prefer stainless steel for the helical spring which engages the strap and the center mounting bracket. In the mechanically operated embodiment of my invention, I prefer stainless steel or plastic for the piston plunger and the hydraulic or pneumatic cylinder. In either embodiment, the other parts, such as the base and mounting brackets can be made of any material which is not adversely affected by moisture, as aluminum, wood, stainless steel, plastic and the like. The reasons for this preference is that, in most retail or wholesale meat departments, there is a considerable amount of moisture present and a material which would be corroded or oxidized thereby would not be desirable. The hand plunger is most economically and simply made from hard wood.

In the drawings, the numeral 1 indicates the flexible shell of my expandable horn or tube on which, when same is made from stainless steel, I provide a reverse fold 2 on all edges to eliminate any roughness or burrs. The mounting bracket 3 at the large end of the shell 1 fixedly engages the shell 1 at its circumference oppositely disposed from the overlapping longitudinal split in the shell 1 and cooperates with the base 4 to fixedly engage the shell 1 thereto. The guide ring 5 surrounds the shell 1 in non-concentric relation thereto and slidably engages the shell 1 at its circumference oppositely disposed from the overlapping longitudinal split. The mounting bracket 6 cooperates with the guide ring 5 and the base 4 to fixedly engage them. The strap 7 and the helical spring 8 cooperate with each other to surround the shell 1 circumferentially substantially at its longitudinal midpoint in restraining slidable engagement therewith and are fastened, at their oppositely disposed ends to the mounting bracket 6. The numeral 9 indicates the elastic tubular netting having one end drawn over the small end of the shell 1 and the other end extending slightly beyond the small end of the shell 1 in position to receive the meat to be netted. The hand plunger is comprised in a head 10 and a handle 11 and the head 10 is of slightly smaller diameter than inside diameter of the guide ring 5 in order that, upon motivation, the head 10 may pass longitudinally from the large end to the small end of the shell 1 and, in so passing, force ahead of it the meat to be netted and circumferentially expand the shell 1. The numeral 12 indicates the head of the mechanical type plunger, being of the same shape and size as the head 10, and is rigidly fixed to the piston 13 which slidably engages the cylinder 14 in internal concentric relation thereto. The cylinder 14 is fixedly engaged to the base 4 by mounting brackets 15 in such position that its longitudinal section line coincides with the extension of the center line of the shell 1 beyond the large end of shell 1. Inlet 16 and outlet 17 are provided in cylinder 14 for the ingress and egress of pneumatic or hydraulic motive means supplied from any available power source (not shown) to provide longitudinal movement of the piston 13.

I have constructed by expandable horn in different sizes for testing. However, I have found that the most feasible size range is comprised in a diameter of six (6) inches to ten (10) inches at the large end and, respectively, three (3) inches to five (5) inches at the small end. This size range will accommodate virtually all cuts of meat or aggregated pieces of meat which are customarily tied or netted for use in the retail trade. It is understood, of course that the extent of overlap at the split in shell 1 must be sufficient to avoid opening of the split when the shell 1 is expanded to the greatest capacity permitted by the guide ring 5. Otherwise, a portion of the meat would escape therethrough and, even though it might be confined in the netting, the meat would not be evenly netted.

The elastic tubular netting which I use is comprised of longitudinal and circumferential strands, thereby forming squares which, in the unexpanded condition, are approximately three-eighths (⅜) to one-half (½) inch on each side. After the meat is stuffed into the elastic tubular net, it is ready for sale and use and nothing further need be done to it. Accordingly, it will be seen that, through the use of my apparatus and method, an operator can do, in a few seconds, the operation which would require several minutes through the old hand tying method or even the method of making a hand application of netting. Further, the end product is uniform, possesses customer appeal and does not separate in use as a result of strand slippage or breakage.

It is important to note that the thin sheet of metal or plastic comprising my shell, while being flexible, has a natural resiliency. Therefore, it is possible to construct a workable apparatus, embodying my invention, without the restraining means comprised in the strap 7 and the spring 8. However, I have found that a more desirable compaction of the meat is obtained when the said restraining means is employed. I have also constructed the shell of my invention in the form of a slightly deformed truncated cone; i.e. having a slight concaveness in the sides. However, this form is more difficult and expensive to fabricate.

It is, further, an important point of novelty in my invention that, while my shell is expandable, there are no joints or abrupt changes in contour therein and may be readily and effectively cleaned, so that no meat particles remain therein and no contamination from spoiled meat particles or blood can result.

It will be obvious that certain changes may be made in the arrangement set forth in the specification and shown in the drawings, it being understood that modifications in the precise embodiment of the invention may be made within the scope of the following claims without departing from the spirit of the invention.

I claim as my invention:
1. An apparatus for netting meat and meat products comprised in a radially expandable horn or shell of thin flexible resilient sheet metal or plastic formed in the shape of an open ended truncated cone and having a longitudinal separation therein, a non-resilient guide ring encircling the said shell in non-concentric relation and slidably engaging the said shell at a point substantially at its longitudinal midpoint, a fixed base rigidly connected to the said shell at a point adjacent its larger end and rigidly connected to the said guide ring, the edges of said shell overlapping in a slidable engagement with each other at the said longitudinal separation and the said overlap being of such order of magnitude that the said slidable engagement is maintained when the said shell is expanded to circumferential engagement with the said guide ring.

2. An apparatus for netting meat and meat products according to claim 1 and having resilient restraining means mounted in external circumferential slidable engagement with said shell substantially at its longitudinal mid-point.

3. An apparatus for netting meat and meat products according to claim 1 and having a mechanically operated piston and cylinder rigidly mounted on said base in longitudinal spaced relation to the said shell and in such position that the said piston, when extended, passes longitudinally through the said shell.

References Cited by the Examiner
UNITED STATES PATENTS

| | | | |
|---|---|---|---|
| 271,759 | 2/1883 | Adkisson | 141—390 |
| 2,946,166 | 7/1960 | Baxter | 53—124 |

FRANK E. BAILEY, *Primary Examiner.*
R. L. FARRIS, *Assistant Examiner.*